US007933590B2

(12) United States Patent
Jung et al.

(10) Patent No.: US 7,933,590 B2
(45) Date of Patent: Apr. 26, 2011

(54) DMB DATA RECEIVING APPARATUS AND METHOD FOR IMPROVING DMB DATA RECEIVING SPEED

(75) Inventors: Ji-Wuck Jung, Suwon-si (KR); Young-Jip Kim, Suwon-si (KR); Hyun-Chul Kim, Suwon-si (KR)

(73) Assignee: Samsung Electronics Co., Ltd., Yeong Tong-Gu, Suwon-Si, Gyeonggi-Do (KR)

( * ) Notice: Subject to any disclaimer, the term of this patent is extended or adjusted under 35 U.S.C. 154(b) by 900 days.

(21) Appl. No.: 11/434,340

(22) Filed: May 15, 2006

(65) Prior Publication Data

US 2006/0281444 A1 Dec. 14, 2006

(30) Foreign Application Priority Data

Jun. 14, 2005 (KR) ................................ 50993/2005

(51) Int. Cl.
*H04L 29/08* (2006.01)
*H04B 3/38* (2006.01)
*H04B 7/14* (2006.01)

(52) U.S. Cl. ........................... 455/414.4; 455/8; 455/15

(58) Field of Classification Search ............... 455/414.4, 455/8, 15

See application file for complete search history.

(56) References Cited

U.S. PATENT DOCUMENTS

2003/0137964 A1 7/2003 Suenaga et al.
2003/0220080 A1* 11/2003 Chuberre et al. .......... 455/67.13
2004/0136334 A1* 7/2004 Heiman et al. ................ 370/316
2005/0249231 A1* 11/2005 Khan ........................... 370/428
2006/0128418 A1* 6/2006 Quelle et al. ............... 455/550.1
2007/0242701 A1* 10/2007 Lee et al. ...................... 370/487

FOREIGN PATENT DOCUMENTS

| | | |
|---|---|---|
| GB | 2374770 | 10/2002 |
| JP | 08-032534 | 2/1996 |
| JP | 2001-308747 | 11/2001 |
| JP | 2002-232478 | 8/2002 |
| JP | 2002-359601 | 12/2002 |
| JP | 2002-368707 | 12/2002 |
| JP | 2004-120150 | 4/2004 |
| WO | WO 99/01957 | 1/1999 |
| WO | WO 02/13058 | 2/2002 |
| WO | WO 02/087140 | 10/2002 |

* cited by examiner

*Primary Examiner* — Nghi H Ly
*Assistant Examiner* — Michael Mapa
(74) *Attorney, Agent, or Firm* — Cha & Reiter, LLC

(57) ABSTRACT

Disclosed is a DMB data receiving apparatus and method for improving a DMB data receiving speed. According to the DMB data receiving apparatus and method, if there are predetermined MSC data, which have not been received or received with an error when receiving MSC data by a DMB reception terminal, the DMB reception terminal can receive the predetermined MSC data through a return channel established between the DMB reception terminal and a broadcasting station. In detail, if there are predetermined MSC data, which have not been received or received with an error, the DMB reception terminal request the broadcasting station to transmit the predetermined MSC data and to allow establishment of a return channel, and then receives the predetermined MSC data through a return channel established based on the request. Therefore, when some MOT content data have not been received or received with an error, the DMB reception terminal can immediately receive the corresponding MOT content data without waiting until the next MOT data transmission period begins, thereby greatly improving the DMB data receiving speed.

16 Claims, 7 Drawing Sheets

DMB DATA RECEIVING APPARATUS AND METHOD FOR IMPROVING DMB DATA RECEIVING SPEED

CLAIM OF PRIORITY

This application claims the benefit under 35 U.S.C. 119(a) of an application entitled "DMB Data Receiving Apparatus And Method For Improving DMB Data Receiving Speed," filed in the Korean Intellectual Property Office on Jun. 14, 2005 and assigned Serial No. 2005-50993, the entire contents of which are incorporated herein by reference.

BACKGROUND OF THE INVENTION

1. Field of the Invention

The present invention relates to digital multimedia broadcasting (DMB), and more particularly to an apparatus and method for receiving data broadcasted through a DMB data broadcast channel.

2. Description of the Related Art

A terrestrial DMB technology enables reception broadcast signals while a user roaming. The terrestrial DMB is based on the European-type digital audio broadcasting (DAB) standard, which provides a data service, as well as video and audio services, through a DMB data broadcast channel.

Broadcast protocols for broadcasting data for terrestrial DMB may be largely classified into three types of protocols, that is, a Multimedia Object Transfer (MOT) protocol, a Transparent Data Channel (TDC) protocol, and Internet protocol (IP) Datagram Tunneling. The MOT protocol is used for broadcasting time-independent data, such as a broadcasting Web site or a slide show. Thus, the MOT protocol is one of the most frequently-used protocols for broadcasting DMB data. In detail, the MOT protocol is used to divide DMB data for a data service into an object unit (i.e. into a plurality of object data) and a broadcast the object data with formation information required for forming the DMB data for the data service using the object data, thereby providing a data broadcasting service through a DMB data channel. Therefore, DMB data transmitted based on the MOT protocol include MOT header data and MOT body data corresponding to the MOT header data. The MOT header data contain construction information, such as the size of the MOT data, the service type of the DMB data transmitted through the MOT protocol, etc.

The TDC protocol is used to transmit time-dependent data in the form of a bit stream, which is different from the MOT protocol transmitting data encapsulated in the object unit. One of representative TDC protocols is a Transport Protocol Expert Group (TPEG) protocol used for transmitting broadcasting traffic information or the like.

The IP is used to transmit and receive datagram data on the Internet through IP tunneling. Such data transmission protocols enable various data to be transmitted to DMB reception terminals through a broadcast channel.

However, since the terrestrial DMB is used by a broadcasting system, the terrestrial DMB is transmitted generally in one direction. That is, when providing a data service using a broadcasting signal based on the MOT protocol, a DMB (Digital Multimedia Broadcasting) broadcasting station only broadcasts broadcast data to DMB reception terminals, but has no way of checking whether or not the broadcasted DMB data have been received without any error by the DMB reception terminals. For this reason, the DMB broadcasting station broadcasts the DMB data repeatedly at a predetermined interval during a predetermined period, i.e. during a broadcasting time period of the DMB data, so that each DMB reception terminal can correctly receive DMB data, which have been received with an error, through the repeated broadcasting.

FIG. 1A is a view illustrating the flow of data (MOT data) broadcasted based on the MOT protocol through a data broadcast channel in the terrestrial DMB. It can be understood from FIG. 1A that MOT object data and MOT header data are periodically and repeatedly broadcasted according to a predetermined MOT data transmission period. The MOT data transmission period is determined based on the number of MOT data that are included in DMB data transmitted through the MOT protocol. That is, when one DMB data includes five MOT object data, the MOT data transmission period corresponds to a period of time, which is required for transmitting five MOT body data corresponding to the five MOT object data, and corresponds to a construction information (i.e. five MOT header data).

The MOT body data and MOT header data may be broadcasted in one of two schemes. One of the two scheme is to group/encapsulate all MOT header data for all MOT body data included in one MOT data transmission period into one MOT data (i.e. a MOT directory) and to transmit the grouped/encapsulated MOT directory. The other scheme is to separately transmit each MOT header data. A part "(a)" shown in FIG. 1A represents an example of a scheme for transmitting all MOT header data using a MOT directory, which is a group of MOT protocol headers, and a part "(b)" shown in FIG. 1A represents an example in which MOT header data and MOT body data are broadcasted as MOT object data are transmitted.

Herein, the MOT body data represent actual content data of DMB data, which include a-plurality of MOT object data. The MOT header data include information relating to the size of MOT body data which is the payload of corresponding MOT object data, information relating to the size of MOT header data, a transport ID dedicated for the MOT object data, and additional information about the service type of the DMB data or the like. Therefore, after receiving all MOT header data or the MOT directory, the DMB reception terminal can obtain the original DMB data by re-forming the received MOT body data based on the transport ID, thereby providing a DMB data service to the user using the obtained DMB data.

However, each the MOT object data, that is, each of the MOT headers and MOT bodies typically contains a plurality of main service channel (MSC) data. The MSC data are received through a plurality of packet data or Extend Program Associated Data (X-PAD) subfields from the broadcasting station. Each of the MSC data forming the MOT header or MOT body includes serial information for forming each corresponding MOT object data. For example, MSC data forming the MOT header may have serial information from No. 1 to No. 10, and also MSC data forming the MOT body may have serial information from No. 1 to No. 10. In this case, each MSC data includes information about whether MOT object data formed by using the MSC data correspond to a MOT header or a MOT body, in addition to the serial information.

FIG. 1B is a view illustrating an example of the construction a plurality of MSC data for forming one MOT object data (i.e. one MOT header or MOT body) and packet data or X-PAD data for forming the MSC data. as shown, a DMB reception terminal forms the MSC data using data received through a packet mode or X-PAC mode. Herein, the MSC data include an MSC data group header, which stores information for forming the MOT object data such as a transport ID, a segment number representing a serial number of the MSC data, and the last segment number required to form MOT object data corresponding to the transport ID. In addition, the MSC data group header may include information relating to the number of MSC data required to form the MOT object data.

Accordingly, when having received the MOT directory or a plurality of MOT header data individually, the DMB reception terminal can recognize the number of MOT object data forming data (DMB data) for a DMB data service. Also, the DMB reception terminal can recognize MSC data used for forming the MOT object data in a single transmission period by using the received MSC data group header. Therefore, the DMB reception terminal can check the MOT object data, which are not re-formed due to MSC data and have not been received or received with an error from among MOT object data in the single MOT data transmission period.

Accordingly, the DMB reception terminal checks such MSC data, which have not been received thereby or have been received with an error, so as to receive the corresponding MSC data during a next MOT data transmission period. If the MOT object data are formed by receiving all MSC data without an error during one MOT data transmission period, the DMB reception terminal re-forms the MOT object data, thereby generating DMB data for a DMB data broadcasting service.

As described above, when the DMB reception terminal does not receive all MSC data contained in the entire MOT object data transmitted during a single MOT data transmission period, the DMB reception terminal must wait until the next MOT data transmission period starts.

Meanwhile, the terrestrial DMB is intended to enable the user to receive a DMB broadcast even while the user is moving. However, when the user receives MOT data while he/she is moving, the probability of error occurrence becomes high. Furthermore, it is impossible to guarantee that MSC data, which have not been received or received with error, can be received without an error during the next MOT data transmission period. Thus, according to the conventional data transmission scheme, the DMB reception terminal must repeatedly receive MSC data in every MOT data transmission period until receiving the MSC data of all MOT object data without an error during one MOT data transmission period, thereby significantly reducing the data receiving speed of the DMB reception terminal.

SUMMARY OF THE INVENTION

Accordingly, the present invention has been made to solve the above-mentioned problems occurring in the prior art and provides additional advantages, by providing a DMB data receiving apparatus and its related method capable of improving a data receiving speed when a DMB reception terminal receives DMB data broadcasted through a DMB broadcast channel.

In accordance with one aspect of the present invention, there is provided a digital multimedia broadcasting (DMB) data reception apparatus for enhancing a DMB data receiving speed in a DMB reception terminal, which receives primary DMB data from a broadcasting station that broadcasts DMB data, creates secondary DMB data by using at least one of the received primary DMB data, and provides a user with a DMB data service by using at least one of the secondary DMB data. The DMB data reception apparatus includes: a secondary DMB data forming unit for receiving at least one primary DMB data and forming secondary DMB data using the received primary DMB data; a primary DMB data requesting unit for creating a request message to appoint and request a predetermined primary DMB data when it is perceived that the predetermined primary DMB data have not been received or received with an error by the secondary DMB data forming unit, transmitting the request message through a predetermined request message channel and requesting the establishment of a return channel for receiving the predetermined primary DMB data to the broadcasting station; and a return channel transmission/reception unit for receiving a primary DMB data from the broadcasting station through the return channel when the return channel is established between the DMB reception terminal and the broadcasting station based on the request message, and transmitting the received primary DMB data to the secondary DMB data forming unit.

In accordance with another aspect of the present invention, there is provided a method of receiving digital multimedia broadcasting (DMB) data by a DMB reception terminal, which receives at least one primary DMB data broadcasted from a broadcasting station, creates secondary DMB data by using the received primary DMB data, and provides a user with a DMB data service by using at least one of the created secondary DMB data. The method includes the steps of: receiving at least one primary DMB data in order to form one of the secondary DMB data; checking if there are primary DMB data, which have not been received, when receiving the primary DMB data to form one of the secondary DMB data; creating a request message for requesting the broadcasting station through a predetermined request message channel to transmit the predetermined primary DMB data, when there are missed primary DMB data; establishing a return channel between the DMB reception terminal and the broadcasting station based on the request message, and receiving the predetermined primary DMB data through the established return channel; and creating the secondary DMB data by using the received primary DMB data.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1A:
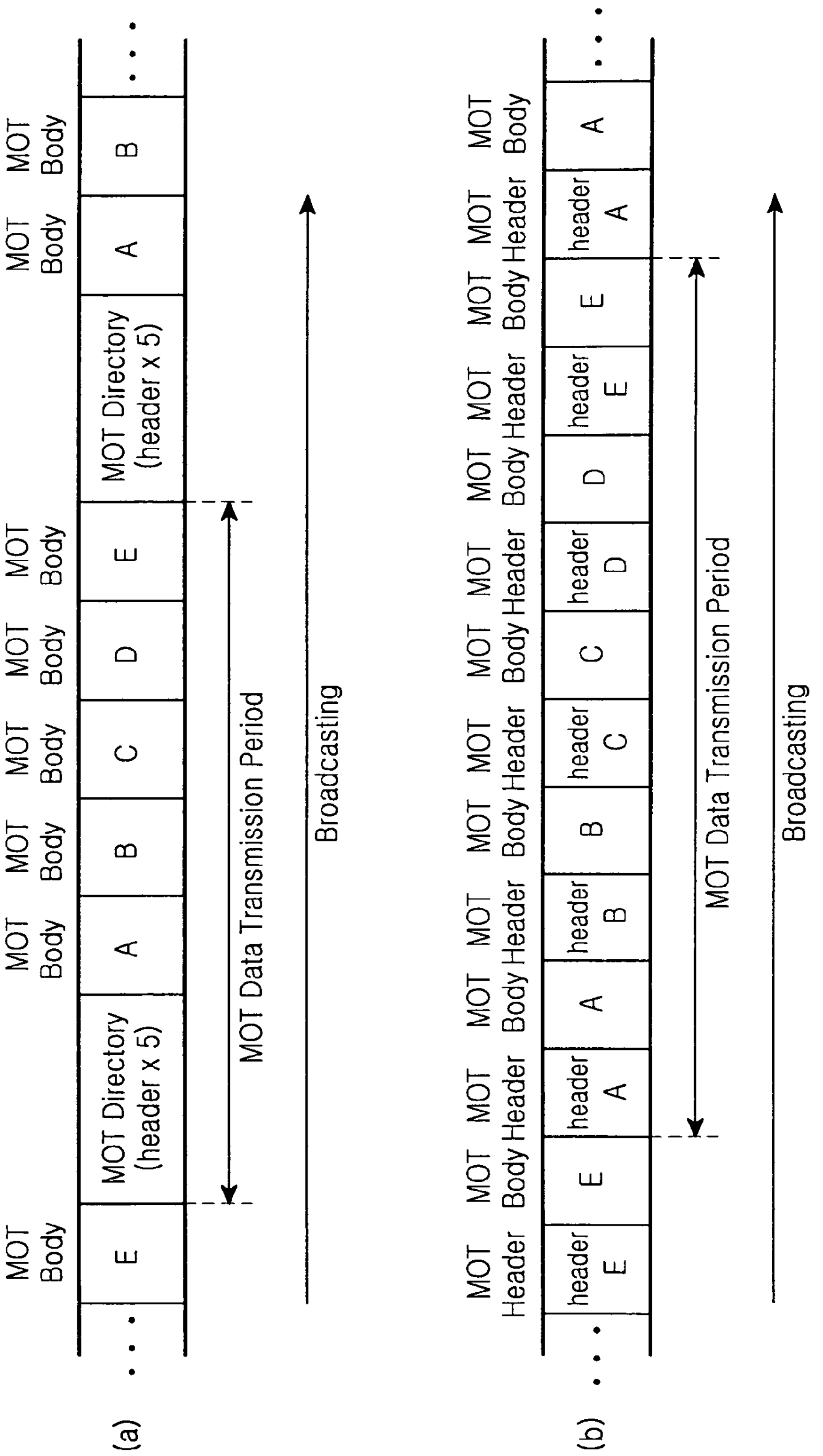
FIG. 1A (PRIOR ART)
FIG. 1A illustrates the flow of data broadcasted through a data broadcast channel in a conventional DMB broadcasting system.

Hereinafter, an embodiment of the present invention will be described with reference to the accompanying drawings. It is to be noted that the same elements are indicated with the same reference numerals throughout the drawings. For the purposes of clarity and simplicity, a detailed description of known functions and configurations incorporated herein will be omitted as it may obscure the subject matter of the present invention.

The current terrestrial DMB (Digital Multimedia Broadcasting) reception terminal has the functions of a mobile terminal (that is, a communication function, a short message service (SMS) reception function, and a multimedia message service (MMS) reception function) as well as a DMB reception function. To this end, the current DMB reception terminal uses an additional transmission route, as well as a transmission route for DMB broadcasting, to establish a two-way communication. One exemplary mobile terminals having such a function is a DMB phone, which has not only a DMB reception function of receiving a DMB broadcast through a transmission route for DMB broadcasting, but also the basic communication function of a mobile terminal using a mobile communication network, such as CDMA (Code Division Multiplex Access), WCDMA (Wideband-CDMA), or GSM (Global System for Mobile communication). Such a DMB phone uses an additional transmission route (i.e. a mobile communication network), which is different from a transmission route for DMB broadcasting, as well as the a transmission route for DMB broadcasting. The additional transmission route, which the DMB reception terminal uses in addition to the transmission route for DMB broadcasting, is known as "return channel". Such a return channel may be realized through the Wibro portable Internet, a wideband local area network, etc., as well as the above-mentioned mobile communication networks.

Figure 2:
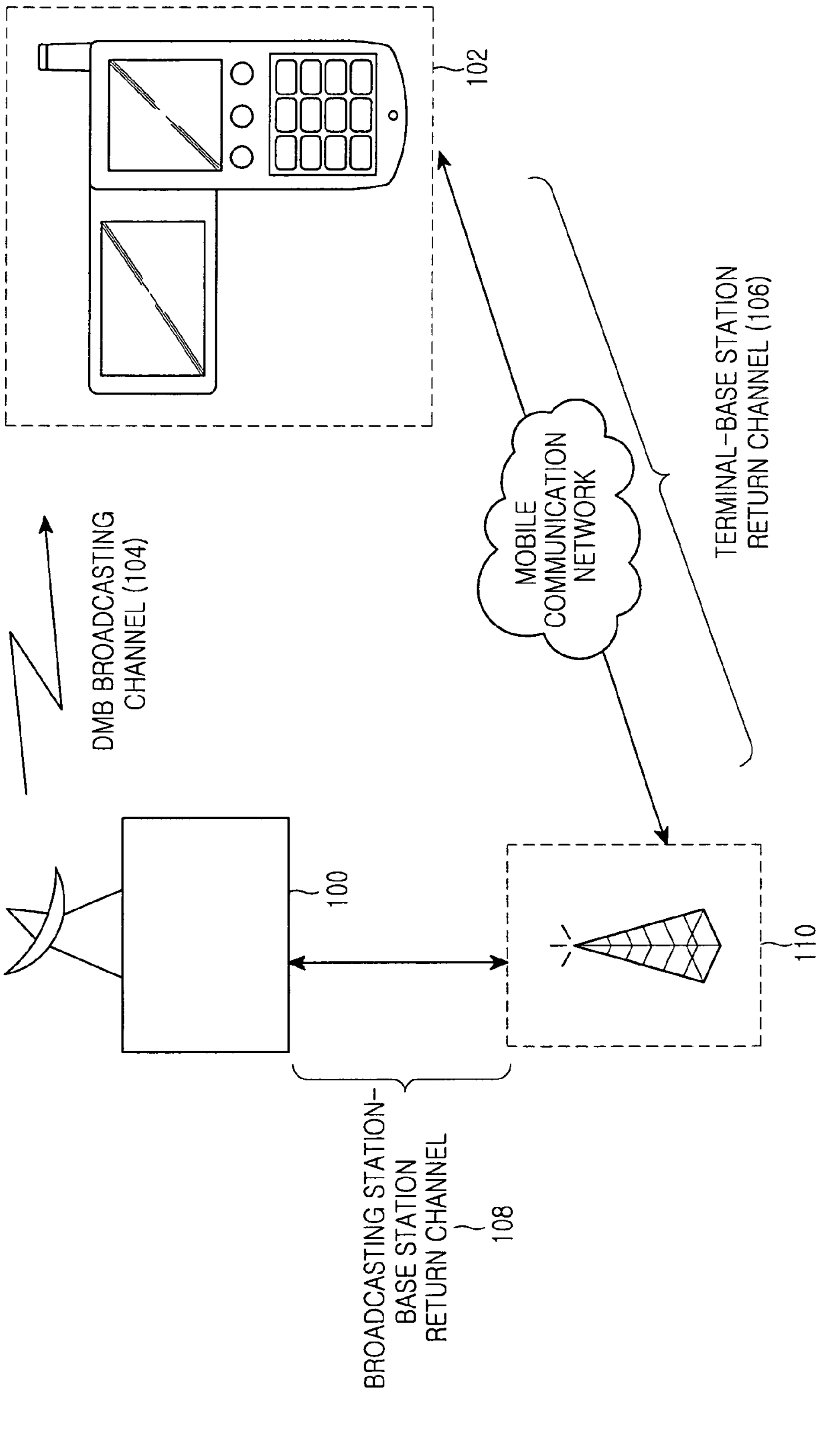
FIG.2 (PRIOR ART)
FIG. 2 illustrates the construction of a conventional DMB broadcasting system in which such a return channel is realized.

FIG. 2 shows the construction of a DMB broadcasting system in which such a return channel is realized through a mobile communication network. A typical DMB broadcasting system includes a DMB broadcasting station 100 for broadcasting DMB data through a DMB channel, a DMB reception terminal 102 for receiving the DMB data from the DMB broadcasting station 100, a base station 110. The base station 110 provides a return channel for enabling a two-way communication service between the DMB broadcasting station 100 and the DMB reception terminal 102.

In addition, the DMB broadcasting system includes a DMB broadcasting channel 104 for transmitting DMB data broadcasted from the DMB broadcasting station 100 to the DMB reception terminal 102, a terminal-base station return channel 106 established between the DMB reception terminal 102 and the base station 110, and a broadcasting station-base station return channel 108 established between the DMB broadcasting station 100 and the base station 304.

As described above, the DMB reception terminal 102 receives MSC data through the DMB broadcasting channel 104 in a packet data mode or X-PAD mode, and forms MOT object data using the received MSC data in order to receive DMB broadcast data from the DMB broadcasting station 100. The user of the DMB reception terminal 102 can participate in a DMB broadcast of the DMB broadcasting station 100 using the terminal-base station return channel 106 established through a mobile communication network, and the broadcasting station-base station return channel 108 either established through a cable communication network by means of an optical cable or established through a wireless communication network such as the mobile communication network. For example, when the DMB broadcasting station 100 is broadcasting a quiz show or game program which is currently in progress, the user of the DMB reception terminal 102 can participate in the broadcast program on-line through the return channel 106 and 208 of the DMB reception terminal 102.

Therefore, the present invention provides a DMB reception terminal capable of improving a DMB data receiving speed by using the return channel established in the current terrestrial DMB broadcasting system, instead of waiting for a next cycle as in the prior art. That is, according to the teachings of the present invention, if a predetermined MSC data have not been received or received with an error, the DMB reception terminal 102 receives the predetermined MSC data through a return channel established between the DMB reception terminal 102 and the broadcasting station 100. Therefore, the present invention provides a DMB data reception apparatus, which requests a predetermined MSC data and a return channel to be established when the predetermined MSC data have not been received or have been received with error, so as to receive the predetermined MSC data through the return channel provided per such request.

Figure 3:
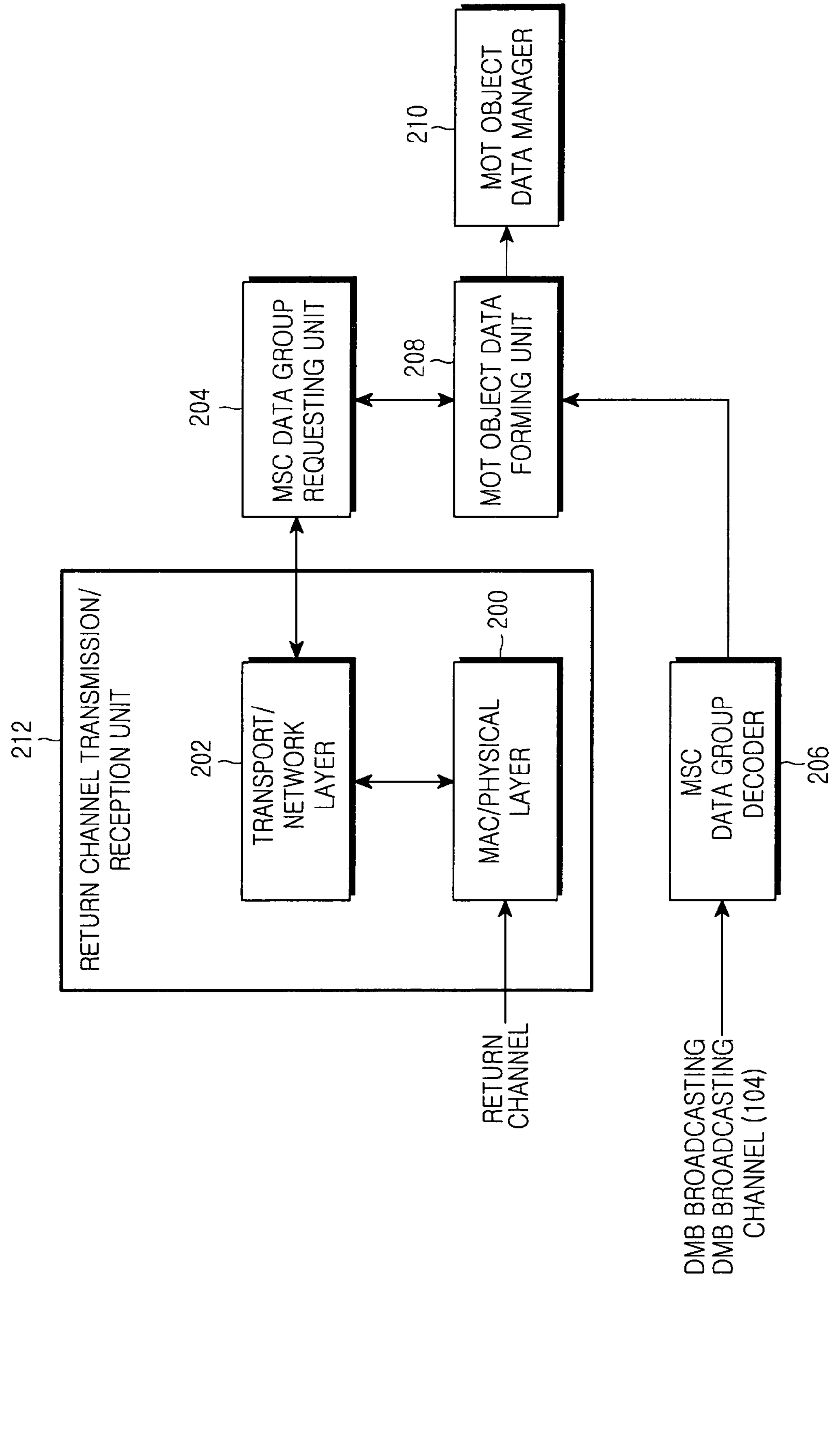
FIG. 3 is a block diagram illustrating the construction of a DMB data reception apparatus included in a DMB reception terminal according to an embodiment of the present invention, which is used for receiving MSC data that have not been received by the DMB reception terminal, through a return channel.

FIG. 3 is a block diagram illustrating the construction of a DMB data reception apparatus included in a DMB reception terminal 102 according to an embodiment of the present invention. The DMB data reception apparatus according to an embodiment of the present invention includes an MSC data group decoder 206, a MOT object data forming unit 208, and a MOT object data manager 210. The MSC data group decoder 206 receives an MSC data group for forming MOT object data through the DMB broadcasting channel 104, and decodes the received MSC data group. The MOT object data forming unit 208 receives an MSC data group from the MSC data group decoder 206, and forms MOT object data by using the received MSC data group. The MOT object data manager 210 receives the formed MOT object data, creates original DMB data by using the received MOT object data, and provides the created DMB data to the user according to the control of a controller.

In addition, the DMB data reception apparatus according to the present invention further includes an MSC data group requesting unit 204 and a return channel transmission/reception unit 212. The MSC data group requesting unit 204 transmits a request message, which appoints and requests predetermined MSC data through the TCP/IP network according to the control of the controller, when the MOT object data forming unit 208 senses that the predetermined MSC data have not been received or received with error. When the return channel is established between the DMB reception terminal and the broadcasting station based on the request message, the return channel transmission/reception unit 212 receives the MSC data, which have not been received or received with error, through an established return channel. When receiving the MSC data, been received or received with an error, the return channel transmission/reception unit 212 may input the received MSC data directly to the MOT object data forming unit 208 if the MSC data have not been received or received with an error. Otherwise, been received or received with an error, the return channel transmission/reception unit 212 may input the received MSC data to the MSC data group requesting unit 204 in order to check if the received MSC data correspond to MSC data requested through the request message.

In addition, since the request message is transmitted to the broadcasting station through the TCP/IP network, the DMB data reception apparatus must know the IP address of the broadcasting station. The IP address of the broadcasting station may be transmitted through additional MOT object data, or through an extension field added to a MOT directory.

Therefore, MOT object data received by the DMB data reception apparatus according to an embodiment of the present invention include information relating to the IP address of the broadcasting station.

The return channel transmission/reception unit 212 may be realized by different sets of components depending on the type of the return channel. For instance, if the return channel is established through a mobile communication network, the return channel transmission/reception unit 212 may include a baseband processing unit and an RF module for transmitting the request message through the mobile communication network. Also, if the return channel is established through the Wibro portable Internet, the return channel transmission/reception unit 212 may include an Wibro module. Further, if the return channel is established through the TCP/IP network, the return channel transmission/reception unit 212 may include a first communication unit for communication of a transport/network layer and a second communication unit for communication of a MAC (Media Access Control)/physical layer, so as to make communication through the TCP/IP network.

FIG. 3 shows the construction of the return channel transmission/reception unit 212 when the return channel is established through the TCP/IP network. In this case, since the request message according to the present invention is transmitted through the TCP/IP network, the return channel transmission/reception unit 212 can be used to transmit the request message. However, if the return channel uses a mobile communication network or Wibro portable Internet, other than the TCP/IP network, the request message is transmitted through the other network instead of the TCP/IP network.

Meanwhile, the MSC data, which has been received by the MSC data group decoder 206, are transmitted to the MOT object data forming unit 208 of the DMB data reception apparatus. In this case, if it is impossible to form a specific MOT object data (i.e. a MOT header or MOT body) due to a predetermined MSC data, which have not been received or received with an error, the MOT object data forming unit 208 transmits information about the predetermined MSC data to the MSC data group requesting unit 204. Then, the MSC data group requesting unit 204 creates a request message including information about the predetermined MSC data. Thereafter, the MSC data group requesting unit 204 transmits the created request message to the broadcasting station through the TCP/IP network, based on the IP address of the broadcasting station which is included in MOT object data which have already been formed.

When receiving the request message, the broadcasting station 100 transmits a return channel grant signal for approving the establishment of a return channel to the return channel transmission/reception unit 212. Then, the return channel transmission/reception unit 212, having received the return channel grant signal, establishes a return channel between the DMB reception terminal 102 and the broadcasting station 100. Thereafter, the broadcasting station 100 transmits MSC data requested through the request message to the return channel transmission/reception unit 212, and then the return channel transmission/reception unit 212 receives and inputs the transmitted MSC data to the MSC data group requesting unit 204.

Then, the MSC data group requesting unit 204 checks if the received MSC data correspond to MSC data requested through the request message. When the received MSC data correspond to MSC data requested through the request message, the MSC data group requesting unit 204 inputs the received MSC data to the MOT object data forming unit 208. Therefore, the MOT object data forming unit 208 can immediately receive the predetermined MSC data, which have not been received or received with an error, without waiting for the next MOT data transmission period.

As described above, since the MOT object data forming unit 208 can rapidly form MOT object data without a delay due to MSC data, which have not been received or have been received with an error, the user of the DMB reception terminal can be more quickly provided with the DMB data service when such an error occurs. Also, when any one or a part of MSC data forming the MOT header has not been received or has been received with an error, the DMB reception terminal 102 requests and promptly receives corresponding MSC data, which have not been received or received with an error. Therefore, in a state in which a MOT header is not formed, the DMB reception terminal according to the present invention can instantly form the MOT header without any time delay.

Figure 4:
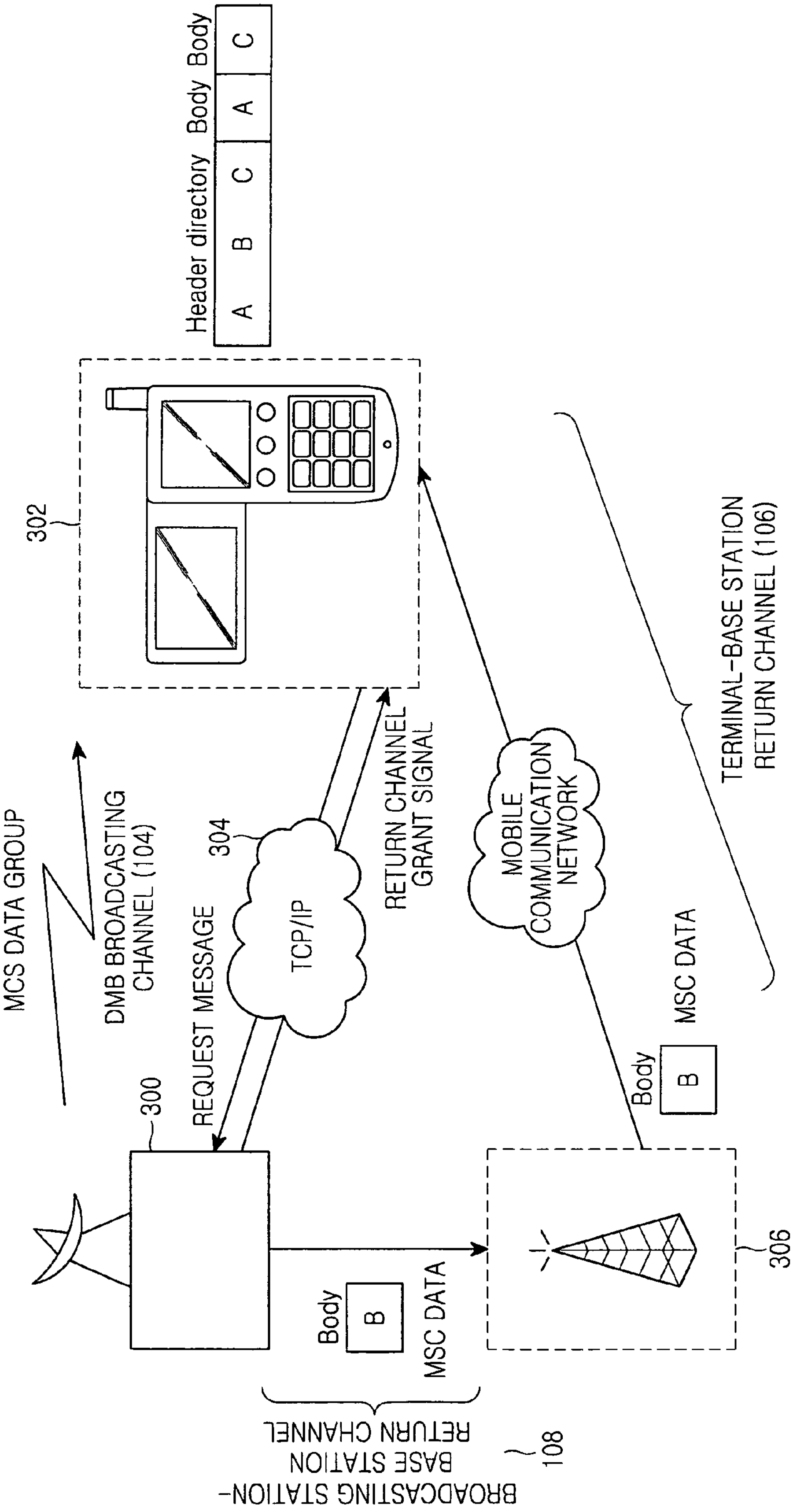
FIG. 4 is a view illustrating the construction of a DMB data broadcasting system in which a DMB reception terminal receives MSC data, which have not been received, through a return channel according to an embodiment of the present invention.

FIG. 4 illustrates the construction of a DMB data broadcasting system according to an embodiment of the present invention. For illustrative purposes and to avoid redundancy, it is assumed in FIG. 4 that MOT header data are transmitted in the form of a MOT directory. Herein, the MOT directory represents a plurality of MOT header data capsulated into one MOT data, as described above. It will be also assumed in FIG. 4 that a return channel is established through the TCP/IP network. Lastly, the description with reference to FIG. 4 will be given on the assumption that a return channel is established through the mobile communication network.

Referring to FIG. 4, the DMB data broadcasting system according to the embodiment of the present invention includes a DMB broadcasting station 300 and a DMB reception terminal 302. The DMB broadcasting station 300 repeatedly broadcasts DMB data (i.e. MSC data) to form MOT header data and MOT body data via a DMB broadcasting channel 104 at every predetermined period. Upon receiving a transmission request for specific MSC data from the DMB reception terminal 302 through the TCP/IP network, the DMB broadcasting station 300 transmits the requested MSC data to the DMB reception terminal 302 through a return channel. The DMB reception terminal 302 receives MSC data from the DMB broadcasting station 300 during one of the repeated predetermined periods, and forms MOT object data including MOT header data and MOT body data. Therefore, if the MSC data have not been received or received with an error, the DMB reception terminal 302 requests the DMB broadcasting station 300 through the TCP/IP network, which is a transmission route different from the DMB broadcasting channel 104, to transmit the MSC data, and receives the MSC data from the DMB broadcasting station 300 through a return channel when the return cannel is established upon such a request.

In detail, the DMB broadcasting station 300 broadcasts MSC data through the DMB broadcasting channel 104 according to a MOT data transmission period. Then, the DMB reception terminal 302 receives the MSC data and forms MOT object data using the received MSC data. If any one of the MOT object data, that is, the MOT object data corresponding to MOT body "B" cannot be formed, as shown in FIG. 4, the DMB reception terminal 302 perceives that some of the MSC data forming the MOT body "B" have not been received or received with an error. That is, the DMB reception terminal 302 according to the present invention is capable of recognizing that the MSC data have not been received or received with an error.

Figure 1B:
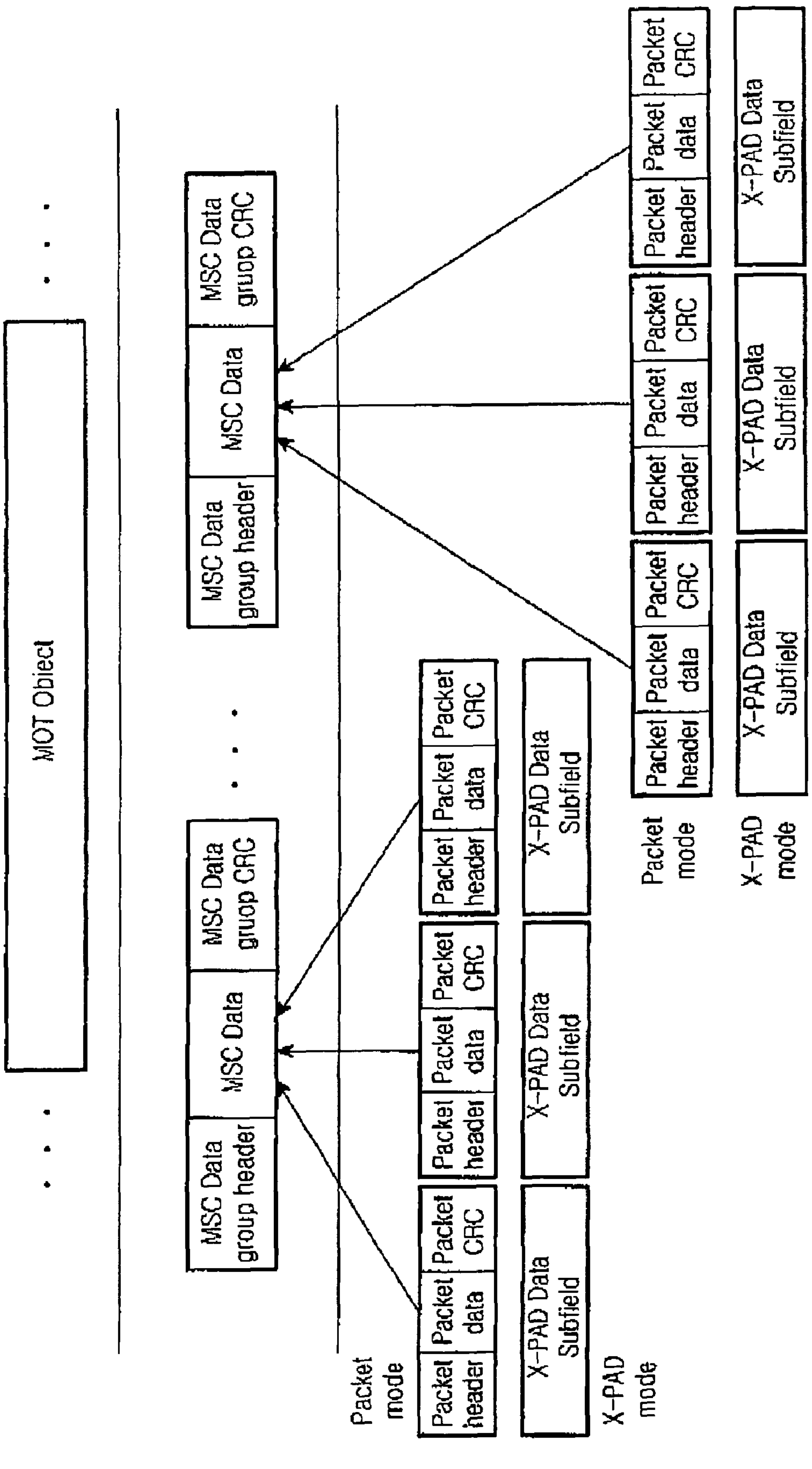
FIG. 1B illustrates the construction of MOT object data formed by using a received MSC data group in a conventional DMB broadcasting system.

Herein, various schemes may be used for the DMB reception terminal 302 to check to determine the proper reception of the MSC data, which have not been received or received with an error. First, as shown in FIG. 1B, segment numbers dedicatedly-allocated for each of the MSC data may be used to determine if the MSC data have been received or received with an error. Otherwise, data stored in a MOT data group CRC field may be used to check whether or not MSC data have an error.

If the MSC data have not been received or received with an error based on above schemes, the DMB reception terminal 302 creates a request message including information as shown in Table 1.

TABLE 1

| 12 bits | 1 bit | 16 or 12 bits | 16 bits | 16 bits |
|---|---|---|---|---|
| EID | SC flag | SID or SCID | TID | Segment field |

In Table 1, the "EID" represents the ID of an ensemble, to which a requested MSC data group belongs, and the "SC flag" field stores a flag of informing whether the MSC data group is input in the form of an X-PAD as shown in FIG. 1B or in the form of packet data. Generally, the SC flag having a value of "0" represents that MSC data groups are transmitted in the X-PAD form, and SC flag having a value of "1" represents that MSC data groups are transmitted in the form of packet data. Therefore, the DMB reception terminal 302 can request an appropriate MSC data group through the request message according to the current transmission state of other MSC data groups.

The "SID or SCID" field is used to specify information about the service type of MOT object data to be formed by using the MSC data group. When the SC flag has a value of "0", that is, when an MSC data group is transmitted in the X-PAC form, an SID (Service ID) of 16 bits is stored in the "SID or SCID" field. In contrast, when the SC flag has a value of "1", that is, when MSC data are transmitted in the packet form, an SCID (Service Component ID) of 12 bits is stored in the "SID or SCID" field. The "TID" is used to store a transport ID of MOT object data to be formed by using the MSC data group. Finally, the "Segment field" stores a segment number of the MSC data.

Therefore, according to an embodiment of the present invention, when the DMB data reception apparatus receives the MSC data with an error, the DMB data reception apparatus creates a request message, which includes a transport ID, a segment ID, information about a service type of the predetermined MSC data, and information about the ID of an MSC data ensemble to which the predetermined MSC data belong. Then, the DMB data reception apparatus checks an IP address of the broadcasting station 300 from MOT object data which have already been formed, and transmits the created request message to the IP address of the broadcasting station 300 through the TCP/IP network 304. Accordingly, upon receiving the request message, the broadcasting station 300 can exactly determine the ID of an ensemble containing predetermined MSC data which have not been received, MOT object data connected with the predetermined MSC data, and/or a segment number of the predetermined MSC data.

The broadcasting station 300 transmits a grant signal in response to the request message. Then, the DMB reception terminal 302 establishes a return channel between the DMB reception terminal 302 and the broadcasting station 300. As shown in FIG. 4, such a return channel may be established to include a terminal-base station return channel 106 and a broadcasting station 306-base station return channel 108 in the mobile communication network. In this case, based on the request message transmitted through the TCP/IP network 304, the broadcasting station 300 transmits MSC data of MOT body data "B", which have not been received or received with an error, to the base station 504 through the broadcasting station-base station return channel 108. In response, the base station 306 transmits the MSC data of the MOT body data "B" to the DMB reception terminal 302. Therefore, the DMB reception terminal 302 can receive the requested MSC data through the return channel. As a result, the DMB reception terminal 302 can receive just the required MSC data without waiting for the next MOT data transmission period, and can completely form the MOT object data, thereby providing a DMB data service to the user without any delay.

Figure 5:
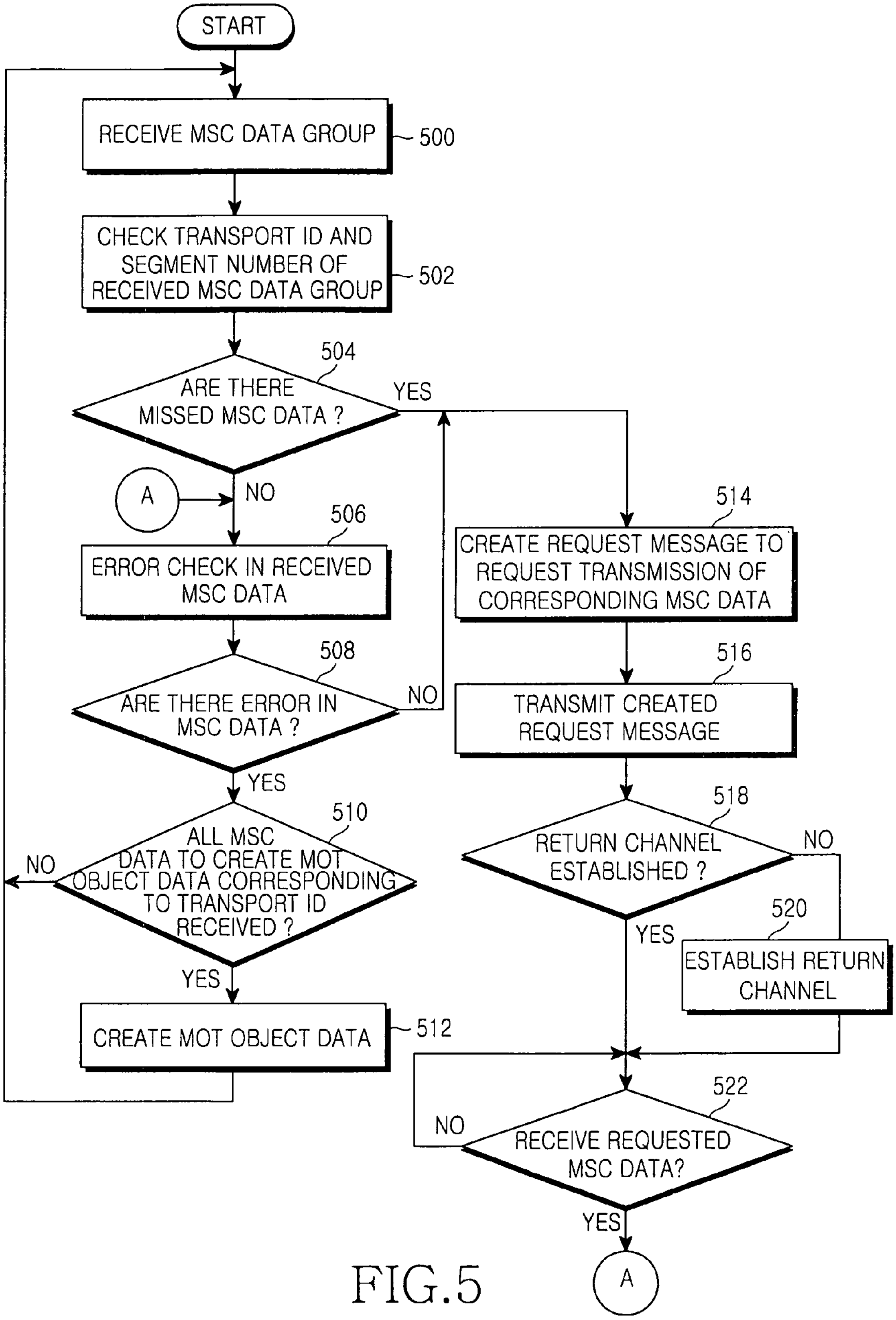
FIG. 5 is a flowchart illustrating a process of allowing a DMB data reception apparatus to request MSC data, which have not been received by a DMB reception terminal, through a return channel and to receive the requested MSC data according to an embodiment of the present invention.

FIG. 5 is a flowchart illustrating the operation of the DMB data reception apparatus according to an embodiment of the present invention, in which the DMB data reception apparatus perceives predetermined MSC data, which have not been received or received with an error in reception of an MSC data group, and then requests the broadcasting station to transmit the predetermined MSC data.

In operation, when the user of the DMB reception terminal 302 selects to receive a DMB data service, the DMB reception terminal 302 including the DMB data reception apparatus according to the present invention proceeds to step 500 of receiving an MSC data group transmitted from the broadcasting station 300. In step 502, the DMB reception terminal 302 checks a transport ID of the received MSC data group and a segment number for each of MSC data included in the MSC data group. Therefore, through step 502, the DMB reception terminal 302 knows information about MOT object data to be formed using the MSC data group, and information about MSC data required to form the MOT object data. That is, if the transport ID of the received MSC data group is "3", the DMB reception terminal 302 can recognize information about MSC data required to form MOT object data having the transport ID of "3", through step 502. Accordingly, the DMB reception terminal 302 recognizes the segment number for the last one of the MSC data forming the MOT object data having the transport ID of "3".

Then, the DMB reception terminal 302 proceeds to step 504, in which the DMB reception terminal 302 determines if MSC data have not been received using the transport ID and the segment numbers of MSC data. Herein, the DMB reception terminal 302 can determine if predetermined MSC data have not been received by checking the transport ID and the segment number for each of MSC data included in the MSC data group which have been received in step 502. That is, on the assumption that the last segment number of an MSC data group required to form MOT object data having a transport ID of "3" is "20", if it is determined as a result of checking segment numbers of received MSC data that MSC data of segment number "9" are received instantly after MSC data of segment number "7" are received, the DMB reception terminal 302 can perceive in step 502 that MSC data of segment number "8" has not been received.

When it is determined in step 504 that all MSC data have been received, the DMB reception terminal 302 proceeds to step 506, in which the DMB reception terminal 302 checks if the MSC data of the currently-received MSC data group have an error. However, when it is determined in step 504 that predetermined MSC have not been received, the DMB reception terminal 302 proceeds to step 514, in which the DMB reception terminal 302 creates a request message including information about the predetermined MSC data. The request message may be formed as shown in Table 1. Then, the DMB reception terminal 302 proceeds to step 516. In step 516, the DMB reception terminal 302 checks the IP address of the broadcasting station 300 from MOT object data which have already been received, and transmits the request message to the broadcasting station 300 through the TCP/IP network 304.

In step 518, the DMB reception terminal 302 checks if a return channel between the DMB reception terminal 302 and the broadcasting station 300 has been established. When it is determined in step 518 that no return channel between the DMB reception terminal 302 and the broadcasting station 300 is established, the DMB reception terminal 302 proceeds to step 520, in which the DMB reception terminal 302 transmits a return channel establishment request signal to the broadcasting station 300, and establishes a return channel when receiving a return channel grant signal from the broadcasting station 300. Then, the DMB reception terminal 302 proceeds to step 522 of checking if the DMB reception terminal 302 receives MSC data based on the request message transmitted in step 516. When receiving the MSC data based on the request message transmitted in step 516, the DMB reception terminal 302 proceeds to step 506 of checking if currently-received MSC data have an error.

In this case, various schemes may be used for the DMB reception terminal 302 to check if the MSC data have an error. For instance, in order to check if the MSC data have an error, the DMB reception terminal 302 may use data of an MSC data group CRC field included in MSC data, as shown in FIG. 1B. Then, the DMB reception terminal 302 proceeds to step 508 of determining if an error is found as a result of step 506. If the received MSC data have an error, the DMB reception terminal 302 returns to step 514 of creating a request message for requesting the broadcasting station 300 to transmit the corresponding MSC data. Then, the DMB reception terminal 302 re-performs steps 516 to 516 so as to receive the corresponding MSC data based on the request message.

In contrast, when it is determined in step 508 that no error is found in the received MSC data, the DMB reception terminal 302 proceeds to step 510, in which the DMB reception terminal 302 checks if all MSC data required to form the MOT object data corresponding to the transport ID have been received. If it is determined that all MSC data required to form the MOT object data corresponding to the transport ID have not been received, the DMB reception terminal 302 returns to step 500 of receiving MSC data forming the MOT object data corresponding to the transport ID.

Meanwhile, it is determined in step 510 that all MSC data required to form the MOT object data corresponding to the transport ID have been received, the DMB reception terminal 302 proceeds to step 512 of creating the MOT object data corresponding to the transport ID. Thereafter, the DMB reception terminal 302 returns to step 500, in which the DMB reception terminal 302 receives an MSC data group having another transport ID.

As described above, the DMB reception terminal 302 including the DMB data reception apparatus according to an embodiment of the present invention can select and request specific MSC data that have not been received or received with an error, to the broadcasting station 300, and can receive the requested MSC data immediately without waiting until the next MOT broadcasting period begins. Accordingly, the data receiving speed of the DMB reception terminal according to the present invention can be greatly improved.

Figure 6:
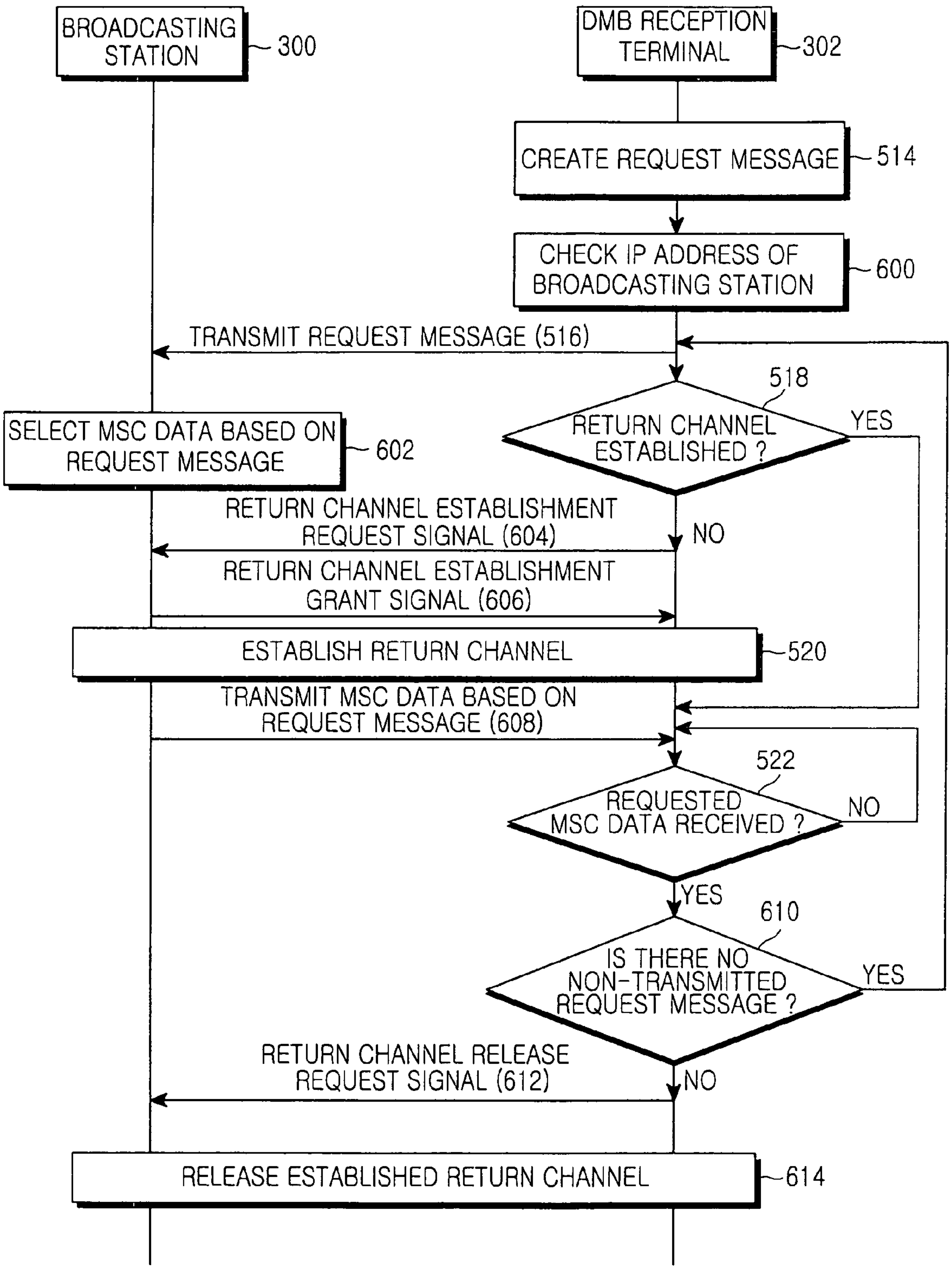
FIG. 6 is a flowchart illustrating a process of allowing a DMB reception terminal to establish a return channel with a broadcasting station and to receive MSC data through the established return channel.

FIG. 6 is a flowchart illustrating a detailed operation of the broadcasting station 300 and the DMB reception terminal 302, corresponding to steps 514 to 522 in FIG. 5, in which the broadcasting station 300 transmits MSC data based on the request message created by the DMB reception terminal 302.

When it is determined in step 504 or 508 that predetermined MSC data have not been received or received with an error, the DMB reception terminal 302 proceeds to step 514, in which the DMB reception terminal 302 creates a request message for requesting the broadcasting station 300 to transmit the predetermined MSC data. Then, the DMB reception terminal 302 proceeds to step 600 of checking an IP address of the broadcasting station 300 from MOT object data which have already been received and reformed. Then, the DMB reception terminal 302 proceeds to step 516, in which the DMB reception terminal 302 transmits the request message created in step 514 to the IP address of the broadcasting station 300 through the TCP/IP network. Thereafter, the broadcasting station 300, having received the request message, proceeds to step 602. In step 602, the broadcasting station 300 searches for MSC data requested through the request message and selects MSC data found through the search. In this case, the broadcasting station 300 searches for MSC data corresponding to an ensemble ID, the transport ID, and a segment number, which are included in the request message.

After transmitting the request message in step 516, the DMB reception terminal 302 proceeds to step 518, in which the DMB reception terminal 302 checks if a return channel has been established between the DMB reception terminal 302 and the broadcasting station 300. When a return channel has been established between the DMB reception terminal 302 and the broadcasting station 300, the DMB reception terminal 302 proceeds to step 522, in which the DMB reception terminal 302 checks if MSC data requested through the request message is received through the return channel established between the DMB reception terminal 302 and the broadcasting station 300. Meanwhile, when it is determined in step 518 that no return channel has been established between the DMB reception terminal 302 and the broadcasting station 300, the DMB reception terminal 302 proceeds to step 604. In step 604, the DMB reception terminal 302 transmits a return channel establishment request signal to the IP address of the broadcasting station 300 through the TCP/IP network.

The broadcasting station 300 proceeds to step 606 of transmitting a return channel establishment grant signal in response to the return channel establishment request signal. When receiving the return channel establishment request signal, the DMB reception terminal 302 proceeds to step 520 of establishing a return channel between the DMB reception terminal 302 and the broadcasting station 300. Herein, the return channel may be established through various networks. For instance, the mobile communication network, the TCP/IP network, the Wibro portable Internet, etc. may be used to establish such a return channel.

When the return channel has been established, the broadcasting station 300 proceeds to step 608 of transmitting MSC data based on the request message. Then, the DMB reception terminal 302 proceeds to step 522, in which the DMB reception terminal 302 checks if the DMB reception terminal 302 receives MSC data requested through the request message created in step 514. Next, the DMB reception terminal 302 proceeds to step 610 of checking if there is a request message which has not yet been transmitted. Herein, the request message, which has not yet been transmitted, refers to a message used for requesting other MSC data, in addition to the MSC data received from the broadcasting station 300 in step 608. However, if predetermined MSC data have been received with an error in step 608 and thus a predetermined request message for the predetermined MSC data is created, the predetermined request message may be regarded as a different request message in step 610.

When the DMB reception terminal 302 determines in step 610 that a different request message exists, the DMB reception terminal 302 returns to step 516 of transmitting the different request message. Then, since the return channel has already been established, the DMB reception terminal 302 proceeds to step 522 directly after step 518, while omitting the step of establishing a return channel. In step 522, the DMB reception terminal 302 checks if the DMB reception terminal 302 receives MSC data based on the different request message from the broadcasting station 300.

Meanwhile, when the DMB reception terminal 302 determines in step 610 that there is no request message which has not yet been transmitted, the DMB reception terminal 302 proceeds to step 612 of transmitting a release request signal for releasing the established return channel to the broadcasting station 300. After the release request signal for releasing the established return channel is transmitted to the broadcasting station 300, the DMB reception terminal 302 proceeds to step 614 of releasing the currently-established return channel.

As described above, according to the present invention, the DMB reception terminal 302 can select predetermined MSC data, which have not been received or received with an error, and can immediately request the predetermined MSC data to the broadcasting station 300, thereby greatly improving the data receiving speed of the DMB reception terminal 302.

According to the present invention, if predetermined MSC data have not been received or received with an error by the DMB reception terminal, the DMB reception terminal can receive the predetermined MSC data through a return channel established between the DMB reception terminal and the broadcasting station. In detail, when the DMB reception terminal cannot form a MOT header due to predetermined MSC data, which have not been received or received with an error, the DMB reception terminal can immediately receive the predetermined MSC data through the return channel. Accordingly, when predetermined MSC data have not been received or received with an error, the DMB reception terminal according to the present invention can immediately receive the predetermined MSC data without waiting until the next MOT data transmission period begins, thereby greatly improving the DMB data receiving speed.

While the present invention has been shown and described with reference to certain preferred embodiments thereof, it will be understood by those skilled in the art that various changes in form and details may be made therein without departing from the spirit and scope of the invention as defined by the appended claims. Particularly, although a detailed structure of a request message according to an embodiment of the present invention is shown in Table 1, the structure of the request message is not limited to the format shown in Table 1. Also, although the present invention has been described with reference to a specific case in which the TCP/IP network is used to transmit a request message, a network other than the TCP/IP network may be used to transmit the request message according to the present invention to the broadcasting station. In addition, although an embodiment of the present invention has been described with reference to a case in which a network for transmitting the request message is different from a network for the return channel, the present invention may be applicable even if the same network is used for the request message and the return channel. Accordingly, the scope of the invention is not to be limited by the above embodiments but by the claims and the equivalents thereof.

What is claimed is:

1. A digital multimedia broadcasting (DMB) data apparatus for enhancing a DMB data receiving speed in a DMB reception terminal, which receives primary DMB data from a broadcasting station that broadcasts DMB data, creates secondary DMB data using at least one of the received primary DMB data, and provides a user with a DMB data service using at least one of the secondary DMB data, comprising:

a secondary DMB data forming unit for receiving at least one primary DMB data and forming the secondary DMB data using the received primary DMB data;

a primary DMB data requesting unit for creating a request message to appoint and request a predetermined primary DMB data when it is perceived that the predetermined primary DMB data have not been received or received with an error by the secondary DMB data forming unit, transmitting the request message through a predetermined request message channel, and requesting an establishment of a return channel for receiving the predetermined primary DMB data to the broadcasting station; and a return channel transmission/reception unit for receiving the primary DMB data from the broadcasting station through the return channel when the return channel is established based on the request message and transmitting the received primary DMB data to the secondary DMB data forming unit;

wherein the return channel is formed through an additional transmission channel separate from the transmission channel for DMB broadcasting;

wherein the DMB reception terminal checks if a return channel predetermined between the DMB reception terminal and the broadcasting station exists, transmits a return channel establishment request signal to the broadcasting station through the request message channel when there is no return channel predetermined between the DMB reception terminal and the broadcasting station, and establishes a return channel between the DMB reception terminal and the broadcasting station when a return channel establishment grant signal is received from the broadcasting station; and wherein the primary DMB data requesting unit uses a wireless TCP/IP network to contact the broadcasting station in order to establish the request message channel;

wherein the secondary DMB data correspond to multimedia object transfer (MOT) object data including a dedicated transport ID, and the primary DMB data correspond to main service channel (MSC) data, which includes the transport ID of the MOT object data to be formed by using the primary DMB data and a segment number that is a serial number of the primary DMB data.

2. The DMB data reception apparatus as claimed in claim 1, wherein the primary DMB data requesting unit receives the primary DMB data from the return channel transmission/reception unit and checks if the received primary DMB data correspond to the predetermined primary DMB data requested through the request message.

3. The DMB data reception apparatus as claimed in claim 1, wherein the secondary DMB data includes an IP address of the broadcasting station in order to transmit the request message to the broadcasting station.

4. The DMB data reception apparatus as claimed in claim 1, wherein the request message transmitted from the primary DMB data requesting unit includes a specific information for secondary DMB data including the predetermined primary DMB data which have not been received or received with an error, specific information for the predetermined primary DMB data, and an ID of an ensemble for broadcasting the predetermined primary DMB data.

5. The DMB data reception apparatus as claimed in claim 1, wherein the return channel transmission/reception unit uses one network from among a code division multiplex access (CDMA) network, a wideband code division multiplex access (WCDMA) network, a global system for mobile communication (GSM) network, a Wibro portable Internet, and a TCP/IP network, in order to establish the return channel.

6. The DMB data reception apparatus as claimed in claim 5, wherein, the return channel transmission/reception unit comprises a communication unit for, receiving the primary DMB data through the return channel depending on a type of the return channel established between the DMB reception terminal and the broadcasting station.

7. The DMB data reception apparatus as claimed in claim 1, wherein the secondary DMB data forming unit perceives the predetermined primary DMB data which have not been received, by using a transport ID of secondary DMB data to be formed by using the predetermined primary DMB data and a segment number of the predetermined primary DWB data, which are included in every primary DMB data.

8. A method for receiving digital multimedia broadcasting (DMB) data by a DMB reception terminal, which receives at least one primary DMB data broadcasted from a broadcasting station, creates secondary DMB data by using the received primary DMB data, and provides a user with a DMB data service by using at least one of the created secondary DMB data, the method comprising the steps of:

receiving at least one primary DMB data in order to form one of the secondary DMB data;

checking if there are primary DMB data, which have not been received, when receiving the primary DMB data to form the one of the secondary DMB data;

creating a request message for requesting the broadcasting station through a predetermined request message channel to transmit the predetermined primary DMB data when there are missed primary DMB data;

establishing a return channel between the DMB reception terminal and the broadcasting station based on the request message and receiving the predetermined primary DMB data through the established return channel; and creating the secondary DMB data by using the received primary DMB data;

wherein the return channel is formed through an additional transmission channel separate from the transmission channel for DMB broadcasting;

wherein the return channel is established by checking if a return channel predetermined between the DMB reception terminal and the broadcasting station exists, transmitting a return channel establishment request signal to the broadcasting station through the request message channel when there is no return channel predetermined between the DMB reception terminal and the broadcasting station, and establishing a return channel between the DMB reception terminal and the broadcasting station when a return channel establishment grant signal is received from the broadcasting station; and wherein the primary DMB data requesting unit uses a wireless TCP/IP network to contact the broadcasting station in order to establish the request message channel;

wherein the secondary DMB data correspond to multimedia object transfer (MOT) object data including a dedicated transport ID, and the primary DMB data correspond to main service channel (MSC) data which include the transport ID of the MOT object data to be formed by using the primary DMB data and a segment number that is a serial number of the primary DMB data.

9. The method as claimed in claim 8, wherein the checking step comprises the steps of:

checking if there are the predetermined primary DMB data, which have not been received, when receiving the primary DMB data to form the one of the secondary DMB data; and checking if an error occurs in the primary DMB data received to form the one of the secondary DMB data, when there is no primary DMB data, which have not been received.

10. The method as claimed in claim 8, wherein the establishing step comprises the steps of:

checking address information for the broadcasting station from the secondary DMB data which have been received;

transmitting the request message to an address of the broadcasting station through a predetermined request message channel;

checking if a return channel predetermined between the DMB reception terminal and the broadcasting station exists;

receiving primary DMB data based on the request message from the broadcasting station through a currently-established return channel; and releasing an established return channel if there is no non-transmitted request message.

11. The method as claimed in claim 8, wherein, in the reception loss checking step, it is checked if there are primary DMB data, which have not been received, by using the transport ID and segment number of at least one received primary DMB data.

12. The method as claimed in claim 9, wherein, in the message creating step, when it is determined as a result of the error checking step that predetermined primary DMB data have an error, a request message is created in order to request the broadcasting station through a predetermined request message channel to transmit the predetermined primary DMB data.

13. The method as claimed in claim 8, wherein the request message includes specific information for secondary DMB data including the predetermined primary DMB data, the transmission of which is requested to the broadcasting station, specific information for the predetermined primary DMB data, and an ID of an ensemble for broadcasting the predetermined primary DMB data.

14. The method as claimed in claim 10, wherein the return channel releasing step comprises the steps of:

checking if a request message, which has not yet been transmitted, exists; and releasing the established return channel, when there is no non-transmitted request message.

15. The method as claimed in claim 8, wherein the secondary DMB data includes an IP address as the address information for the broadcasting station.

16. The method as claimed in claim 8, wherein the return channel is established using one network from among a code division multiplex access (CDMA) network, a wideband code division multiplex access (WCDMA) network, a global system for mobile communication (GSM) network, a Wibro portable Internet, and a TCP/IP network, in order to establish the return channel.

* * * * *